(12) United States Patent
Hollier et al.

(10) Patent No.: US 6,389,111 B1
(45) Date of Patent: May 14, 2002

(54) MEASUREMENT OF SIGNAL QUALITY

(75) Inventors: Michael P Hollier; Philip J Sheppard; Richard J Reynolds, all of Ipswich; Antony W Rix, Cambridge, all of (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/180,104

(22) PCT Filed: May 6, 1998

(86) PCT No.: PCT/GB98/01306

§ 371 Date: Nov. 2, 1998

§ 102(e) Date: Nov. 2, 1998

(87) PCT Pub. No.: WO98/53590

PCT Pub. Date: Nov. 26, 1998

(30) Foreign Application Priority Data

May 16, 1997 (EP) ............................................. 97303375
Dec. 10, 1997 (GB) ............................................. 9726125

(51) Int. Cl.[7] ............................................. H04M 1/24
(52) U.S. Cl. ............................. 379/28; 379/1; 379/6; 379/12; 379/24; 379/29
(58) Field of Search ........................... 379/1, 6, 12, 24, 379/26, 27, 31, 32; 704/202, 205, 228, 232, 238, 239, 270, 233; 706/25

(56) References Cited

U.S. PATENT DOCUMENTS 5,715,198 A * 2/1998 Meyers et al. ................. 395/21
5,737,389 A * 4/1998 Allen ............................. 379/1
5,794,188 A * 8/1998 Hollier ........................ 704/228
5,799,133 A * 8/1998 Hollier et al. ................. 395/23
5,867,813 A * 2/1999 DiPietro et al. ............. 704/202
5,999,900 A * 12/1999 Hollier ........................ 704/228
6,011,830 A * 1/2000 Sasin et al. .................... 379/1
6,035,270 A * 3/2000 Hollier et al. ............... 704/202

* cited by examiner

Primary Examiner—Binh K. Tieu
(74) Attorney, Agent, or Firm—Nixon & Vanderhye P.C.

(57) ABSTRACT

A test stimulus includes two signals $R_R$, S. Signal S is transmitted to a customer equipment interface and over a system under test to a complementary remote apparatus. The test apparatus has two inputs processed by a number of functional elements. The first input is the reference signal $R_R$. The other input is a corresponding test signal R' generated at remote test apparatus as a test signal R, identical with reference signal $R_R$, and transmitted over the system under test via the customer interface. These two versions of the same test signal are compared. Firstly, the signals $R_R$, R' are processed by a psycho-acoustic model, the output of which is transmitted to a perceptual layer, and then to a conversion unit which also receives a further input from a non-optimum loudness rating unit. The output from the conversion unit is transmitted to a signal quality determination unit, which also receives an input from the customer equipment interface. The non-optimum loudness rating unit processes inputs from the customer equipment interface and signal generator. During an iterative process, the signal generator receives feedback control from the signal quality determination unit. The remote test apparatus similarly receives a modified version of signal S (viz S') from the network and compares it with a locally-generated reference version $S_R$. In an alternative arrangement the same test apparatus is connected to both test points of the network and processes both signals S and R, either serially or in parallel.

19 Claims, 11 Drawing Sheets

MEASUREMENT OF SIGNAL QUALITY

BACKGROUND OF THE INVENTION

1. Field of the Invention

This invention relates to a method and apparatus for testing telecommunications equipment, and in particular telecommunications equipment over which two-way speech traffic is to be conveyed. The telecommunications equipment in question may be an existing telecommunications network, or part thereof, or individual items of telecommunications equipment not currently in service, for example prototypes of new designs of equipment.

2. Related Art

A number of methods for testing telecommunications equipment have been developed which monitor how the human auditory system responds to a test signal received over the equipment under test, in particular the extent to which distortions introduced by the network are perceptually significant to a listener. In particular the reader is referred to the present applicant's earlier international patent applications, numbers W094100922, W095101011 and W095/15035. In these systems a test signal representative of human speech is transmitted over the system to be tested, and the distortions imposed on the signal by the equipment under test are analysed according to the relative perceptual importance of the distortion imposed. The perceptual distortion depends on such factors as the frequency response of the human auditory system, masking effects (e.g. quiet sounds being less noticeable if louder sounds occur shortly before or after them) and various other factors.

In practical usage most telecommunications systems used for speech carry two-way conversations, in which there are two parties speaking to each other. This affects the way the system responds to the signals input to it. For example, many bidirectional systems use voice activity detection to avoid excessive acoustic noise being transmitted when there is no speech on the respective channel. This results in temporal "clipping", in which the beginning of a user's utterance is lost because of the response time of the voice activity detector. The simulation of such characteristics would allow a system to be tested under more realistic conditions. However, the simulation of a conversation adds a number of complications to the measurement of signal quality.

Firstly, there are two separate signal paths (from the first user to the second user, and from the second user to the first user) and the signal quality will in general be different on the two lines, although such differences are likely to be relatively small in comparison with the differences between different point-to-point telecommunications links. It is therefore necessary to measure the signal quality of both paths.

Secondly, the perceived quality of each path has an effect on the other, because of the behaviour of the human users of the system. One aspect of human interaction is the natural changes of vocal level that occur between two parties during conversation. The levels at which an individual speaks depend on the level and quality of the speech received from the remote party. This means that during a telephone conversation, predominantly in the first few seconds, there is a subconscious adjustment in levels between users as a result of losses and distortions in the network path. This effect leads to a stable equilibrium for both parties. The users of a telephone line are therefore capable of adjusting their vocal output levels in accordance with the signal quality heard on the return path. Within certain limits, users adjust their vocal level according to this feedback. The level at which a user perceives he has to speak has an effect on the signal quality perceived by that user. The adjustment in vocal level itself also modifies the signal transmitted over the telecommunications system to the listener, and this in turn has an effect on the listening effort required of the other user. For example, if part of the telecommunications system is causing a large attenuation of the signal, then the listener will hear a very quiet received signal. Subconsciously assuming that this attenuation occurs in the return path as well, the listener will himself attempt to compensate by speaking louder. This affects certain characteristics of the voice itself, and the strong signal strength may also introduce distortions, for example 'clipping'. These effects, and the greater signal strength itself, will be detected by the other user, who will in turn adjust his voice level accordingly.

Thus, the two-way nature of a typical telephone conversation allows users to compensate for some signal quality deficiencies, but this compensation may itself introduce further or different signal quality defects.

SUMMARY OF THE INVENTION

According to the present invention there is provided a method for testing telecommunications equipment over which two-way speech traffic can be carried between a first test point and a second test point, the method comprising the steps of;

a) generating first and second test signals representative of normal conversation, and each having a predetermined vocal level, b) transmitting the first test signal from the first test point to the second test point, c) simultaneously transmitting the second test signal from the second test point to the first test point, d) measuring the quality of the test signals received at the respective test points, e) determining a vocal level adjustment to be made in response to the quality measured at each test point, and f) adjusting the vocal levels of the first and second test signals, the said steps being repeated until a predetermined condition is reached, and an output being generated when said predetermined condition is reached, the output being indicative of the quality measured; wherein the quality measurement uses a perceptual analysis process which measures the extent to which the received signals carry distortions which would be perceptible to a human listener.

According to a further aspect of the invention there is provided apparatus for testing telecommunications equipment over which two-way speech traffic can be carried between a first test point and a second test point, the apparatus comprising;

means for generating first and second test signals representative of normal conversation, each having a predetermined vocal level;

means for supplying the first test signal to the first test point for transmission to the second test point;

means for detecting at the first test point, a signal received from the second test point;

means for measuring the quality of the detected signal by comparison with the second test signal, using a perceptual analysis process in which the extent is measured to which the received signals carry distortions which would be perceptible to a human listener;

means for determining a vocal level adjustment to be made in response to the measured quality;

means for adjusting the vocal level of the first test signal until a predetermined condition is reached; and means for generating an output indicative of the quality measured when said predetermined condition is reached.

The invention therefore simulates the process by which the participants in a telephone conversation adjust their vocal levels during a telephone call until a predetermined condition, such as an equilibrium, is reached. The perceived signal quality at that equilibrium condition is regarded as the quality of the telecommunications connection which has been established for making the call. This equilibrium may be disturbed, and hence the quality changed, if the characteristics of the connection itself change, for example as a result of changes in radio link quality as a mobile telephone moves relative to its base station, or because of changes in ambient noise, but provided the external conditions remain unchanged the quality of the connection can be regarded as fixed for the duration of a call.

In a preferred arrangement the predetermined equilibrium condition referred to above is that the vocal level of the test signals (or at least one of them) is adjusted in response to the quality measured by less than a predetermined value, indicative that the iterative process is close to an equilibrium point. In practice, a human user continues to make further small adjustments throughout the telephone conversation, but these can be disregarded for the purposes of testing the equipment.

In general the telecommunications equipment under test will interact with the participants in the conversation by means of telephone handsets and other equipment interposed between the user and the network element under test, and these themselves introduce changes to the signal to be carried by the telecommunications equipment under investigation. Therefore, in a preferred embodiment there are interposed customer equipment interface simulators which simulate the modifications to a signal which occur between a talker and the telecommunications equipment under test, and between the telecommunications system under test and the listener. Typically such interfaces simulate the effects of the signal passing from the user's mouth to that part of the telecommunications network which is under test, and from that part of the telecommunications equipment under test to the listener's ear.

As well as the behaviour of the equipment itself, further factors which may be modelled by the customer equipment interface simulator are the effects of sound leakage in the telephone user/equipment interface. The term "leakage" in this context is used to mean any sound entering or leaving the system at the user/equipment interface. The effects to be simulated may include the loss of that part of the sound signal generated by the loudspeaker of a customer handset which is not received by the listener's ear (outward earpiece leakage), the loss of that part of the sound signal uttered by a user which is not detected by the microphone in the telephone mouthpiece (outward mouthpiece leakage), any ambient background noise entering the microphone which does not emanate from the talker (inward mouthpiece leakage), and any ambient sound entering the ear which did not originate from the earpiece loudspeaker (inward earpiece leakage). The frequency response and magnitude of these effects will vary depending on the type of user/equipment interface to be modelled: for example a hands-free loudspeaker telephone suffers more leakage than an earpiece held to the ear, but the leakage at the earpiece varies more with frequency. These effects also depend on the actual acoustic characteristics of the earpiece and mouthpiece, such as their shape and acoustic impedance, and also on whether the earpiece(s) is designed for use with one or with both ears. Attenuation of the signals (to simulate signal loss), or superposition of ambient noise signals, may be applied to simulate these effects. The ambient noise signal is preferably modified to allow for any differences in the signal response of the microphone to the noise and to speech. Further factors characteristic of the customer equipment itself may also be used in determining the total vocal level.

In a typical telephone conversation the two users generally speak and listen alternately. However there are occasional periods of mutual silence in which neither participant is speaking, and there are also occasions when both users are speaking simultaneously. Each of the four situations can generate different signal quality measures at the two receiving ends.

A further factor which can affect perception of signal quality is the presence of noise. Acoustic noise is unwanted ambient sound detected by the mouthpiece of the user's handset, or entering the user's ear through earcap leakage. System noise is a spurious signal generated within the telecommunications system itself, and which generates an audible signal at the earpiece of a user handset. Noise may be present throughout the call, whether or not a speech-like signal is present, although in some circumstances low level noise may become perceptually important only when speech is absent, for example if gain control circuits amplify low-level noise in the absence of a strong signal. Some telecommunications equipment, in particular those of the 'hands-free' type, make use of voice activity detectors, such that no signal is transmitted unless a voice signal is present. In this case noise may only be audible when the speech-like signal is present. As already noted, temporal 'clipping' can occur with such devices. The test signal may model any one or more of these situations.

In one arrangement according to the invention, the test stimulus used comprises two signals for simultaneous transmission from respective test points, wherein the test stimulus comprises different segments in which;

a) only the first test point
b) only the second test point
c) both test points
d) neither test point;
   are generating a signal having a spectral resemblance to human speech but not conveying intelligent content, and in which a noise signal is superimposed on one or both speech like signals.

In another arrangement a first measurement device at the first test point makes a call, through the system to be tested, to a second measurement device at the second test point, and the devices converse using predetermined speech signals, wherein the predetermined speech signals generated by each device are generated dynamically in response to the signals received by said devices, to simulate aspects of conversation over a non-perfect communications system link.

If a live system is to be tested, such that test signals are transmitted between two locations, it is convenient to use two test apparatus, one at each location, both test signals being generated at each location, one for transmission to the remote end, and the other for comparison with that received from the remote end. In laboratory conditions, in which an item of equipment is being tested in isolation, a single test apparatus may be connected to both ends of the equipment under test, and can analyse both paths.

The embodiment to be described models situations in which vocal level is quieter than the psycho-acoustically determined conversational equilibrium value. In some instances, where network mouth-to-ear sensitivity is very high, the vocal level at the ear may be too loud. Accordingly, in this embodiment of the invention, if the received vocal level exceeds a predetermined value, an output is generated to indicate an impaired signal quality.

BRIEF DESCRIPTION OF THE INVENTION

An embodiment of the invention will now be described with reference to the accompanying drawings in which.

Figure 1:
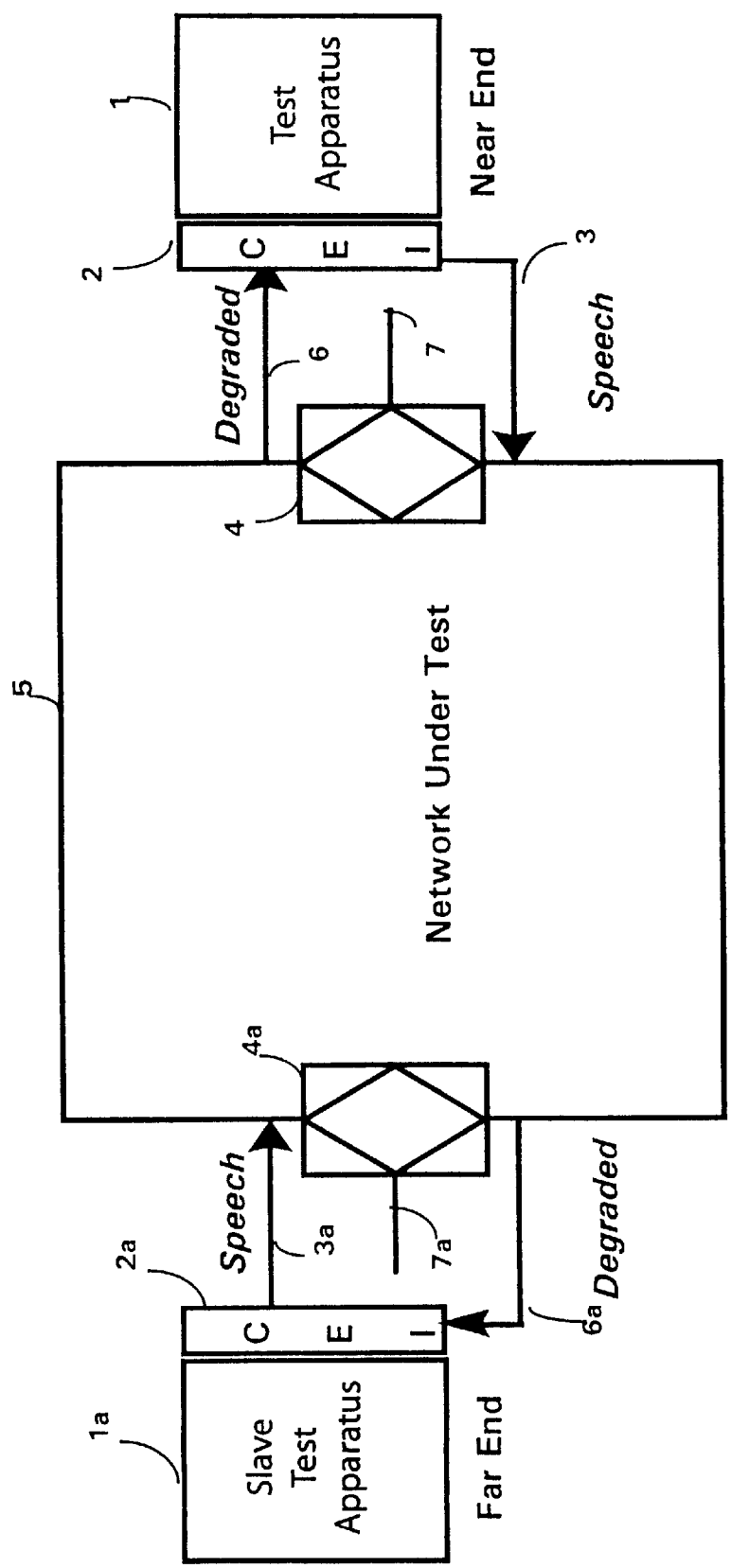
FIG. 1 shows a typical test set up according to the invention.
Figure 3:
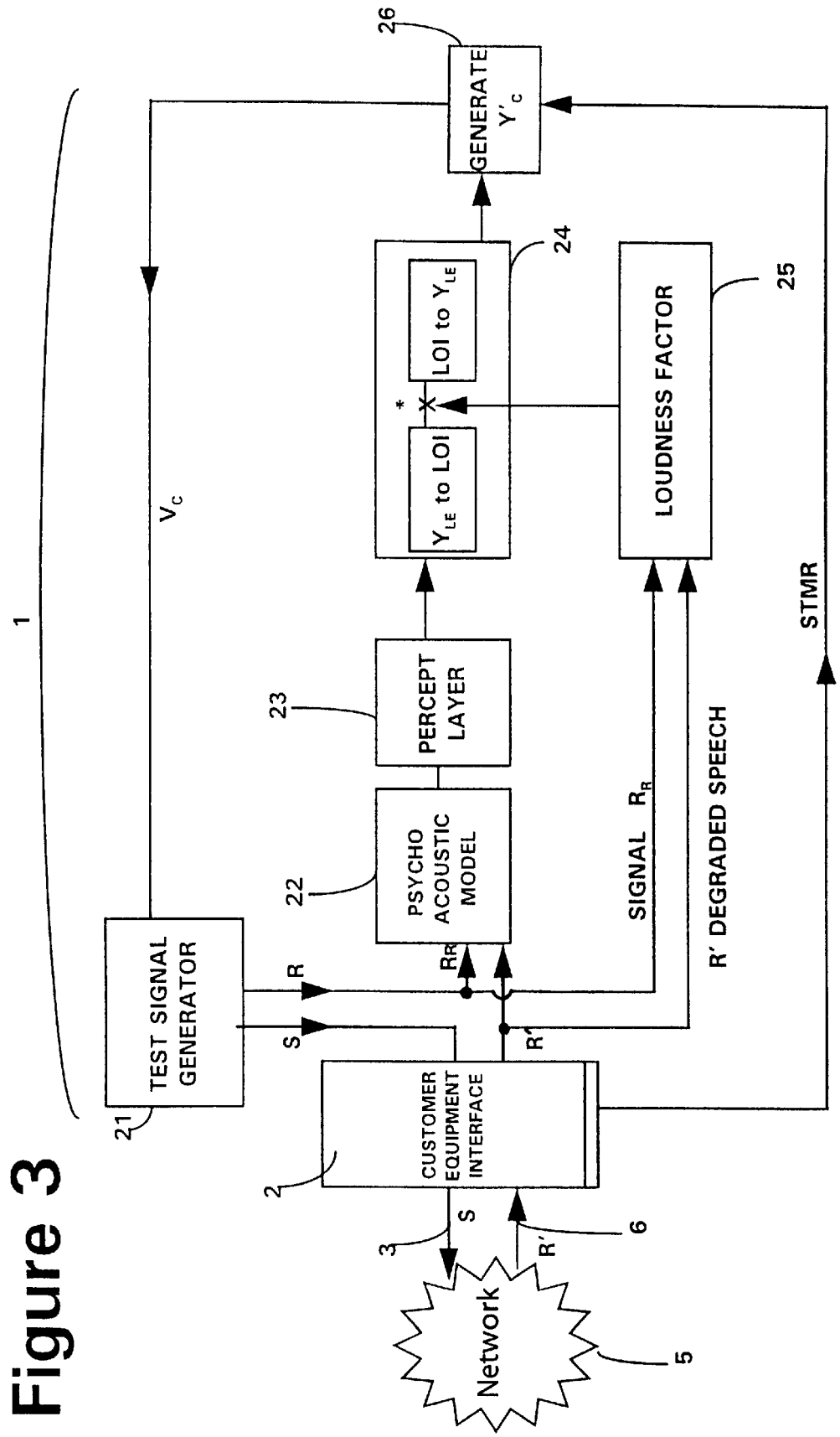
Figure 4:
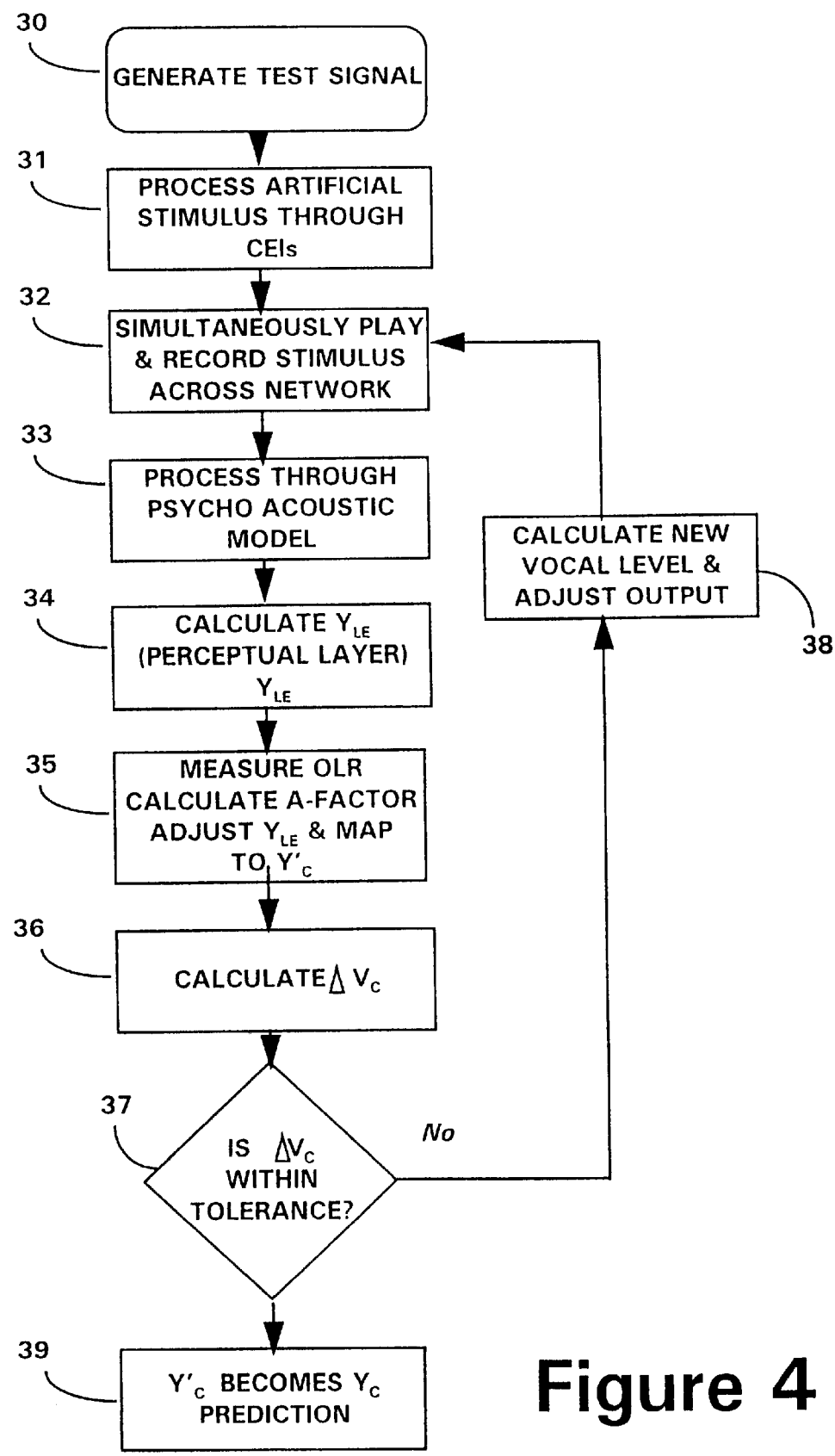
Figure 5:
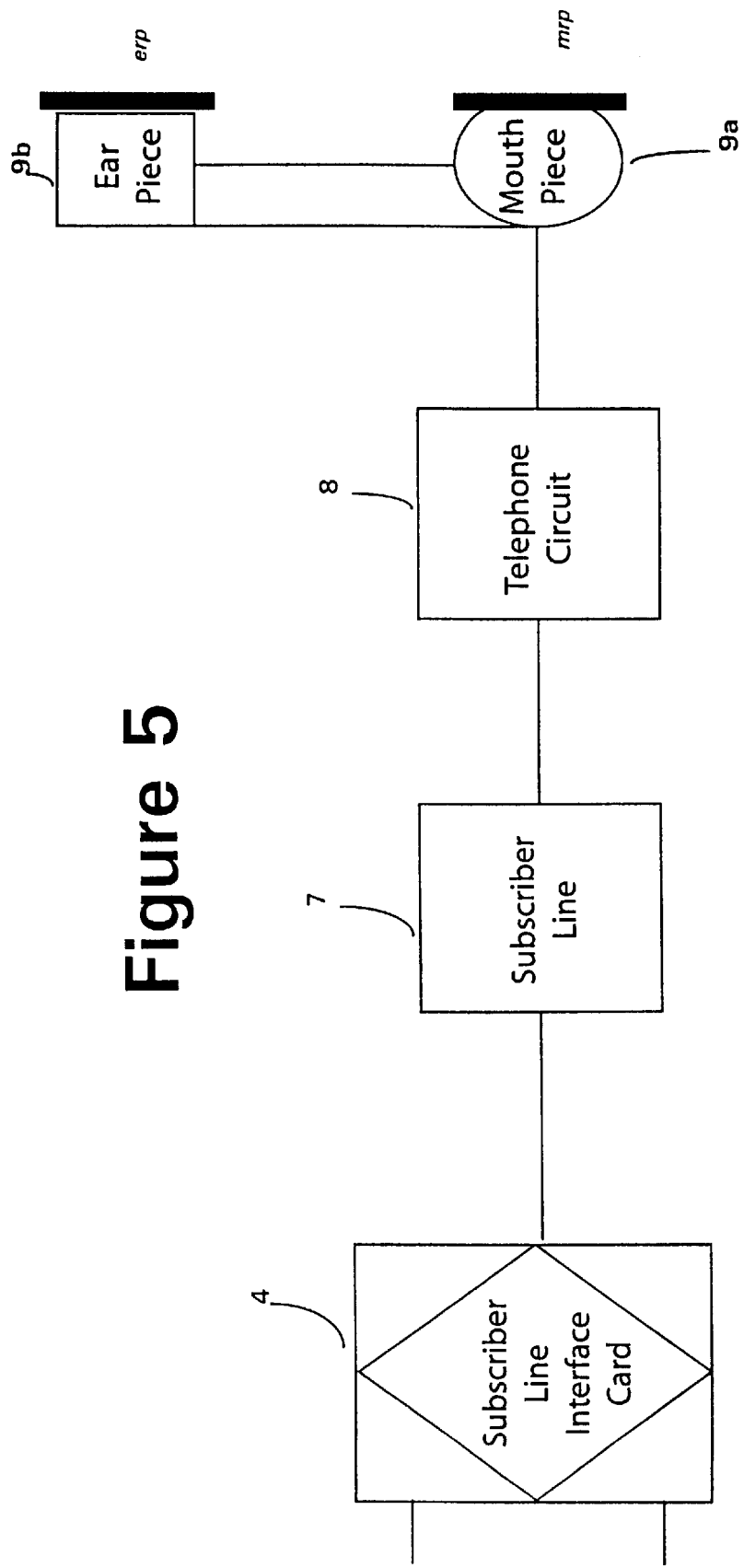
Figure 6:
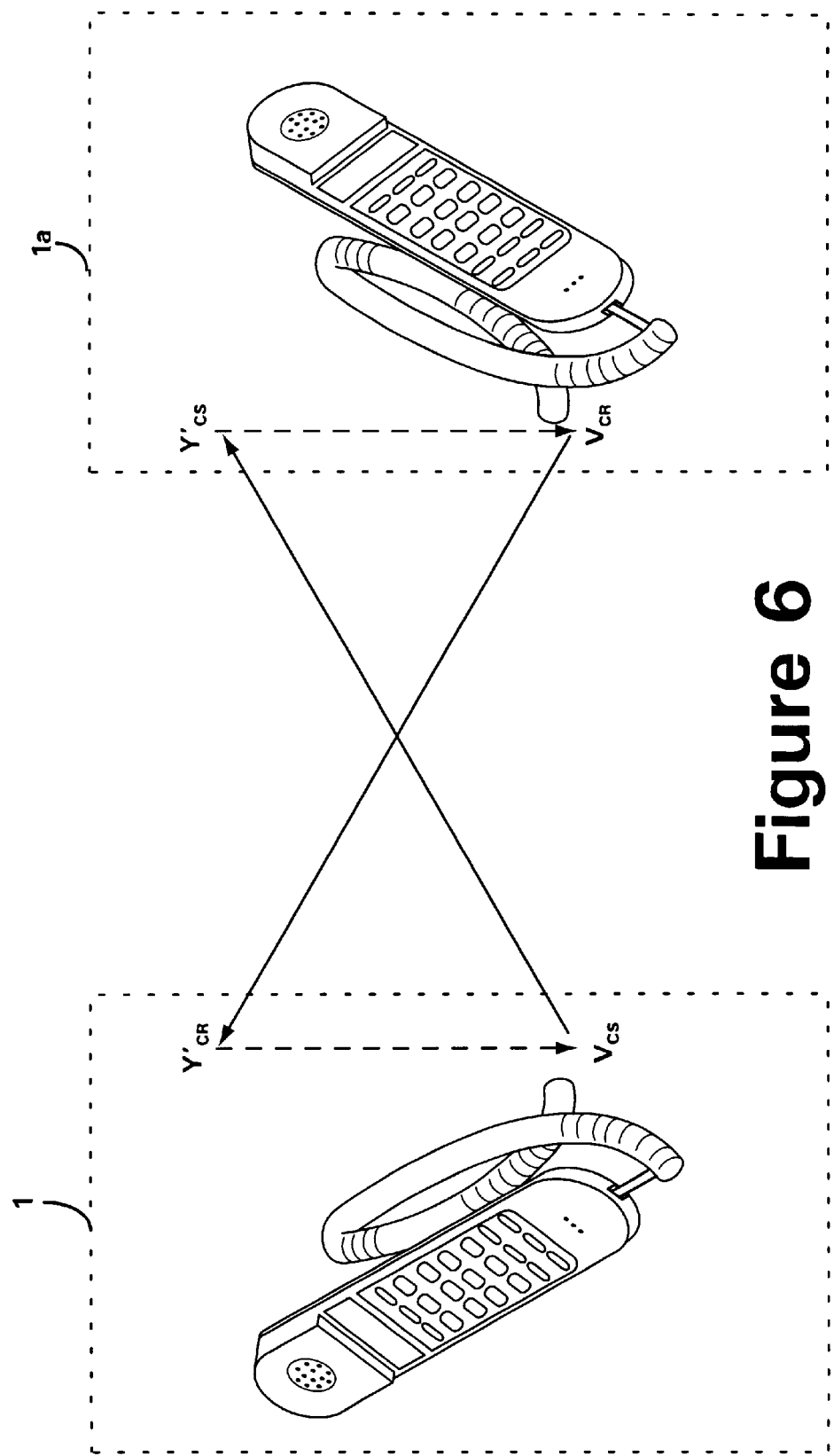
Figure 7:
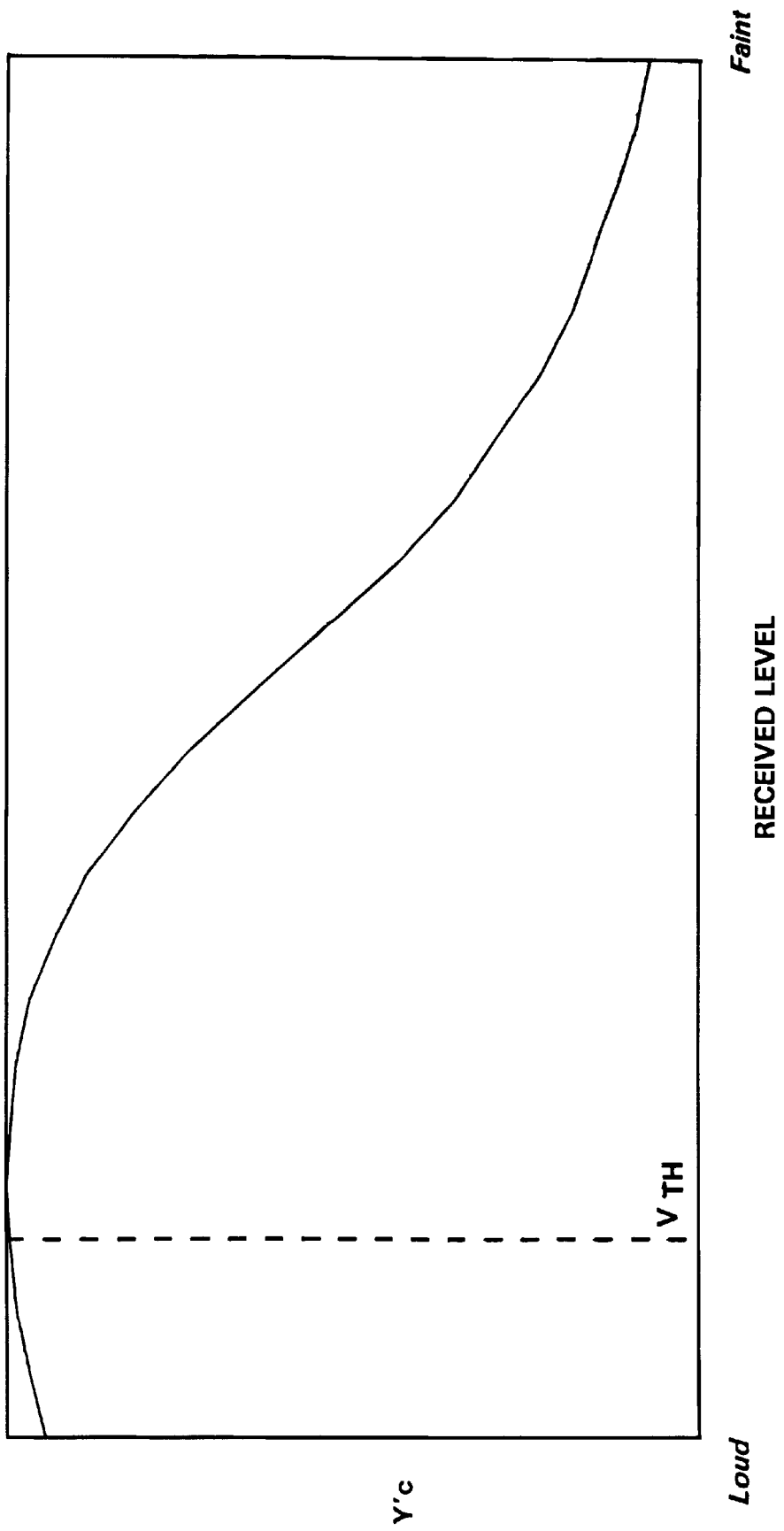
Figure 8:
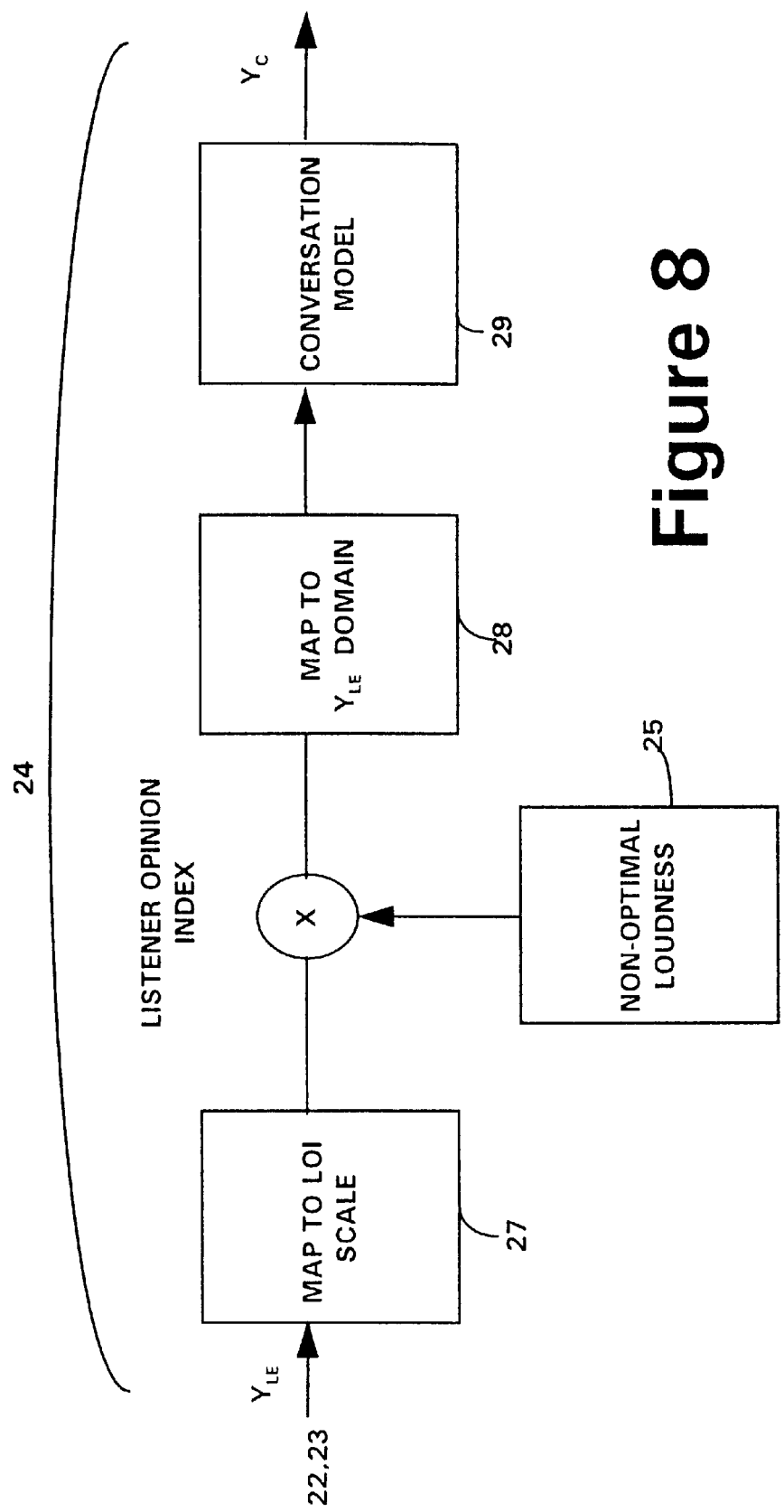
Figure 9:
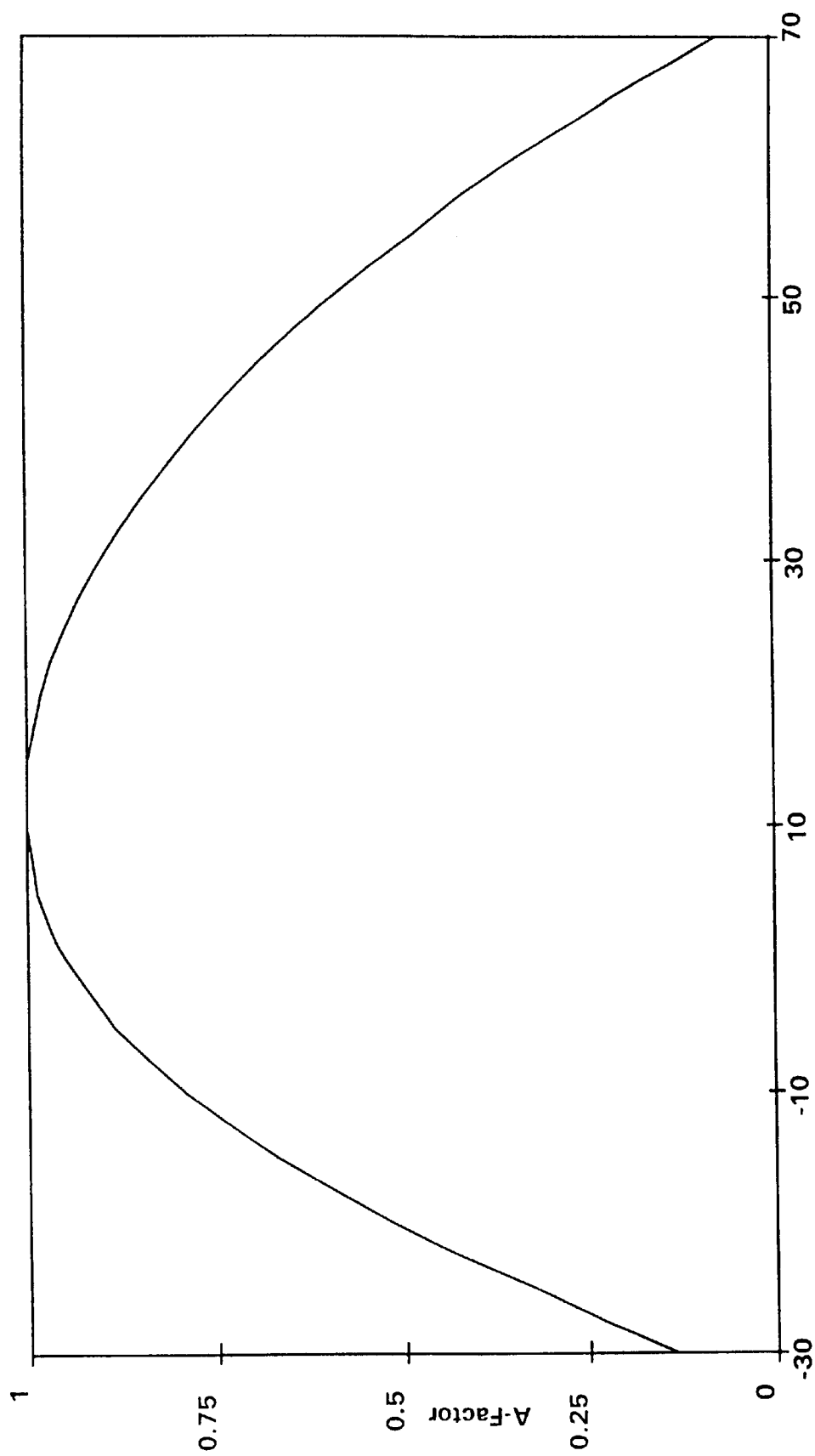
Figure 10:
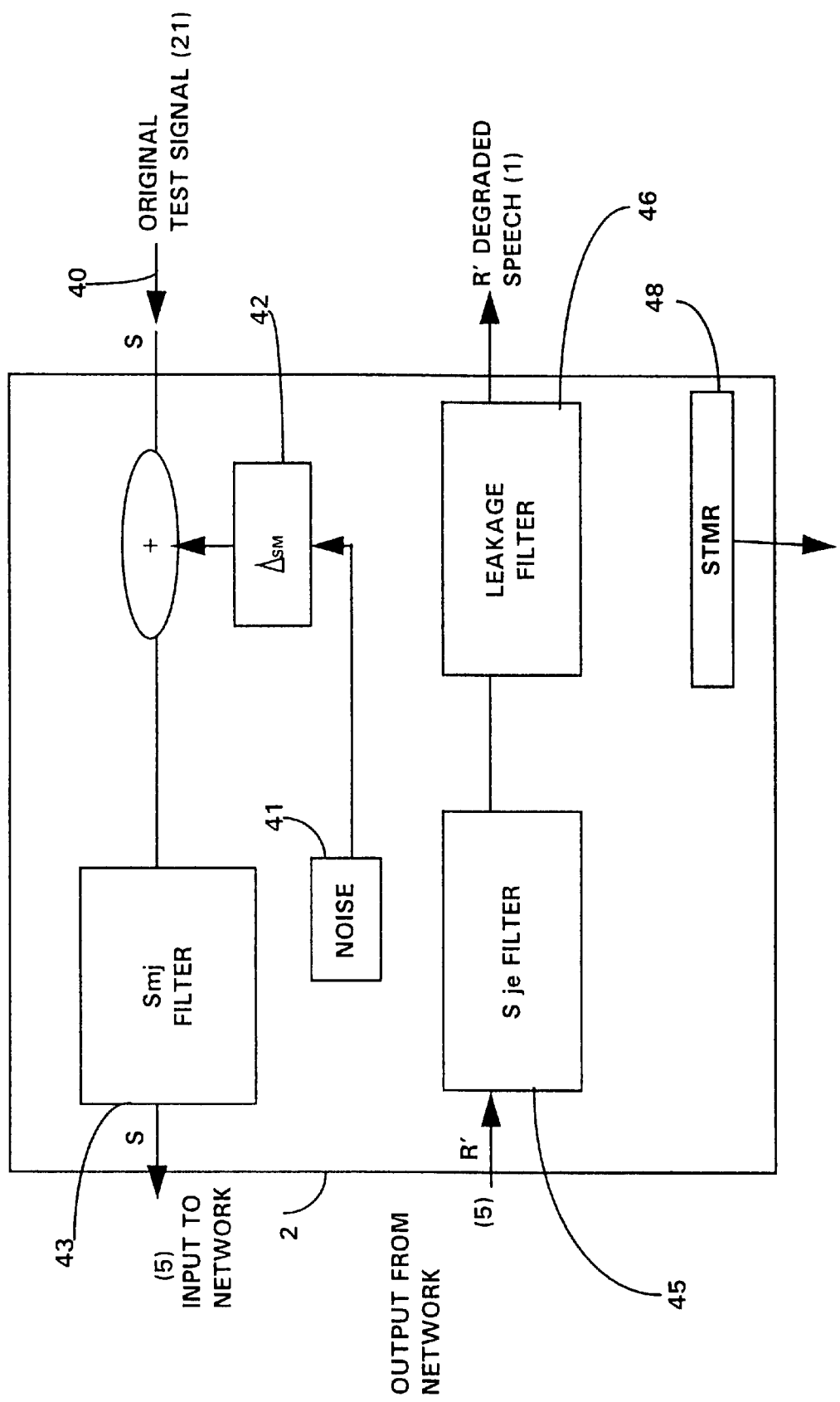

FIG. 3 a schematic diagram showing one of the test apparatuses of FIG. 1 in more detail;

FIG. 4 is a flow chart showing the process carried out by the test method;

FIG. 5 is a schematic of a typical customer interface with a local exchange;

FIG. 6 is a diagram illustrating the iterative process by which the two parties to a telephone conversation reach a mutually optimal conversational voice level;

FIG. 7 shows how the perceived signal quality varies with received signal strength;

FIG. 8 is a schematic illustrating how an existing prior art psycho-acoustic model can be adapted for use in the present invention;

FIG. 9 illustrates how the loudness of a perceived signal affects the perceived listening effort value;

FIG. 10 illustrates schematically a customer equipment interface for use with the test apparatus.

Figure 11:
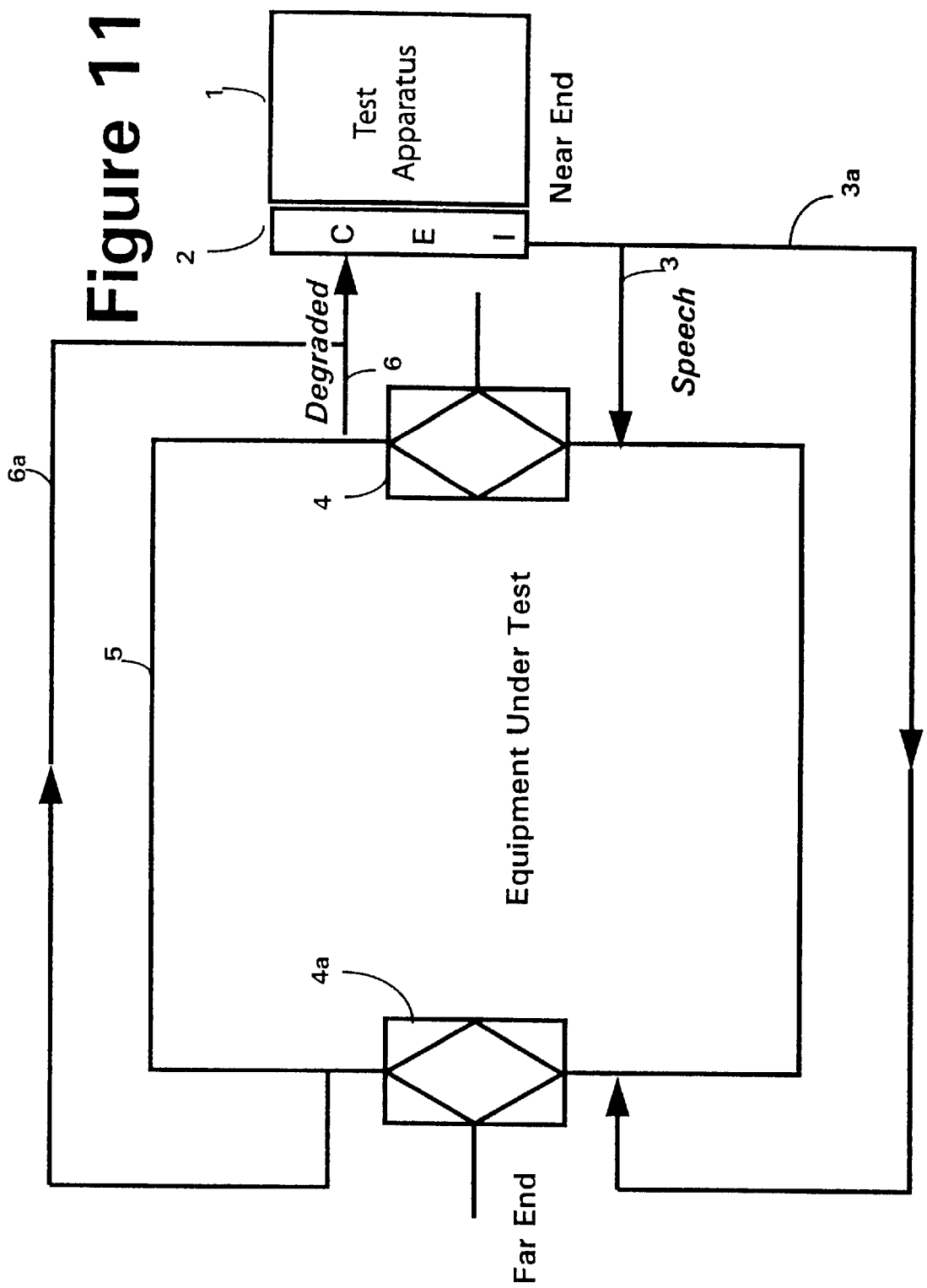

FIG. 11 shows an alternative test set-up to that of FIG. 1.

DETAILED DESCRIPTION OF EXEMPLARY EMBODIMENTS

FIG. 1 schematically shows a test set-up according to the invention. A test apparatus 1, to be described in more detail later, is connected through a customer equipment interface 2 and a two-way connection 3, 6 to a junction point 4, and thereby to a network under test 5. At a remote junction point 4a in the network 5 a further two-way connection 3a, 6a, connects to a further customer equipment interface 2a and thus to a slave test apparatus 1a. The respective test apparatuses 1; 1a, the customer equipment interfaces 2, 2a; and the links 3, 6; 3a, 6a to the network 5 under test are substantially identical at each end.

As shown, each test apparatus 1, 1a is connected to the four-wire side of a two-wire/four-wire junction point 4, 4a in the network, and the two-wire connections 7,7a; junction points 4, 4a; and customer equipment are all simulated by the customer equipment interfaces 2, 2a. However, in alternative arrangements one or both customer equipment interfaces 2,2a may be connected to the network 5 by way of the two-wire connections 7,7a and junction points 4, 4a themselves.

Signals can be transmitted from the first test apparatus 1, through the customer equipment interface 2, over the forward path 3 of the link 3, 6, through the junction 4, the network under test 5, and the junction 4a. The signal, degraded by processing, interference, etc. taking place in the network 5, is transmitted over a downlink 6a of the link 3a, 6a and the further customer equipment interface 2a to the receiving part of the second test apparatus 1a. Similarly there is a return path 2a, 3a, 4a, 5, 4, 6, 2, from the second test apparatus 1a to the first test apparatus 1.

FIG. 11 shows a variant of this test set-up, for use on individual items of equipment for which both connections 4, 4a are accessible by the same test apparatus 1, for example in a test facility. In this case the test apparatus analyses both paths through the equipment (3, 5, 6a and 3a, 5, 6), either alternately or in parallel.

Figure 2:
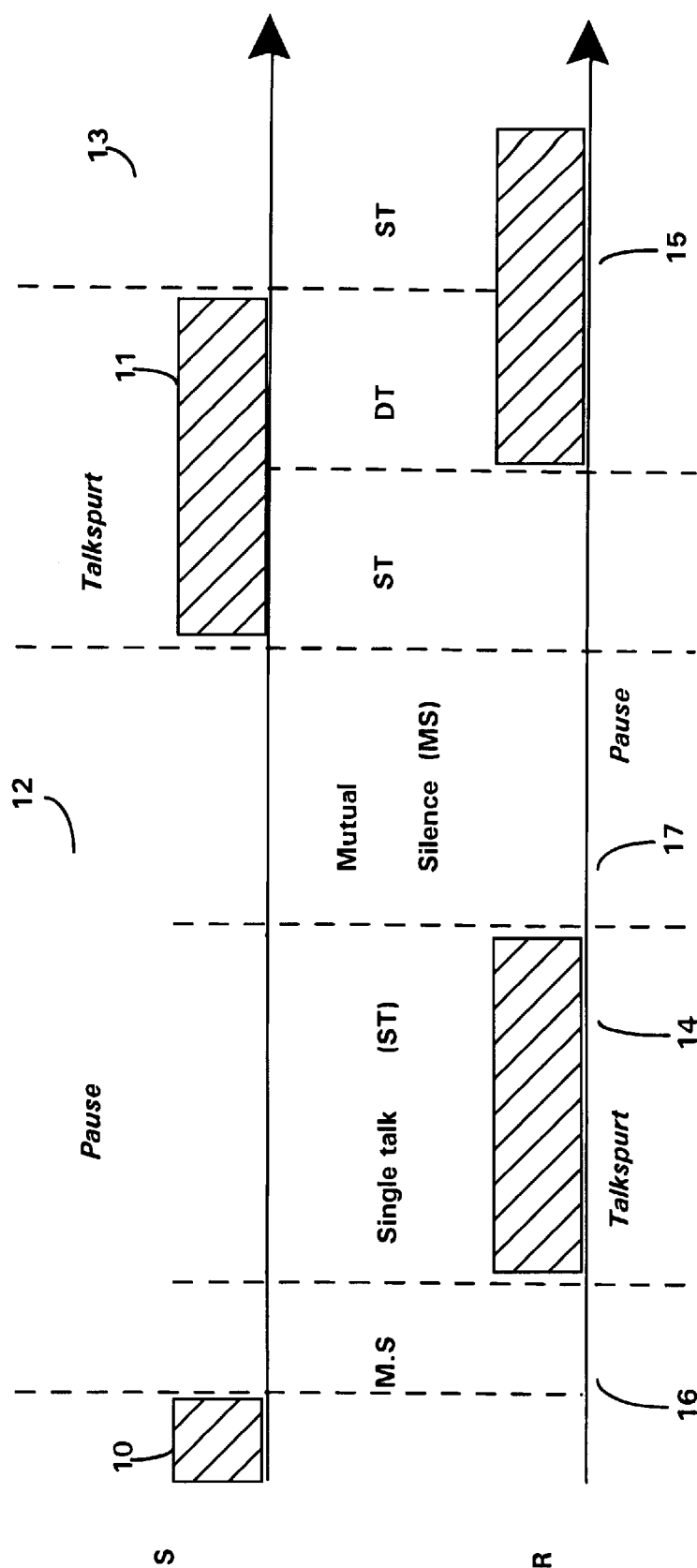
FIG. 2 shows a representation of part of a test stimulus for use in the test system.

FIG. 2 shows various typical elements of a test stimulus for use in the test apparatus of FIG. 1 or 11. A first signal S, for transmission over the forward path 3, 5; 6a, comprises segments of speech, 10, 11 and segments of silence 12, 13. Similarly a second test signal R for transmission over the return path 3a, 5, 6 comprises speech segments 14, 15 and periods of silence 16, 17. It can be seen from FIG. 2 that the test signal is arranged such that there are periods MS of mutual silence, periods ST of "single talk" (where one of the signals is a speech signal and the other is silence), and there are periods DT of "double talk" when both signals comprise speech.

The patterns of speech and silence described with reference to FIG. 2 are compliant with International Telecommunications Union-T Recommendation P.59 (March 1993) "Artificial Conversational Speech". However the content of the individual speech elements are as described in patent application WO95/01011.

In this specification the two signals making up the initial stimulus are referred to as R (the signal received at apparatus 1 from apparatus 1a) and S (the signal sent from apparatus 1 to apparatus 1a), identical signals used as reference signals are referenced $R_R$, $S_R$; and the signals as modified by the network as R' and S'. The customer equipment interfaces also modify these signals, but these modifications are not given separate references in the description.

FIG. 3 shows the test apparatus 1 schematically in more detail. The test apparatus 1 comprises a test signal generator 21 which generates a test stimulus comprising two signals $R_R$, S. Signal $R_R$ is input to the test apparatus 1. Signal S is transmitted to the customer equipment interface 2. The test apparatus 1 also receives a modified version R' of the test signal R. This version R' is produced by generating a signal R, identical with the reference signal $R_R$, at the remote test apparatus 1a and transmitting it over the network 5 and the customer interface 2. These processes cause the signal R to be modified to form the version R'. These two versions $R_R$, R' of the same test signal are compared in the test apparatus 1.

Firstly, the signals $R_R$, R' are processed by a psycho-acoustic model 22, the output of which is transmitted to a perceptual layer 23, and then to a conversion unit 24 which also receives a further input from a non-optimum loudness rating unit 25. The output from the conversion unit 24 is transmitted to a signal quality determination unit 26, which also receives an input STMR (to be explained later) from the customer equipment interface 2. The non-optimum loudness rating unit 25 processes the signals R', $R_R$ (generated by the customer equipment interface 2 and signal generator 21 respectively), to generate a "non-optimum loudness rating". During the iterative process to be described, the signal generator 21 receives feedback control $V_C$ from the signal quality determination unit 26.

The remote test apparatus 1a similarly receives a modified version of signal S (viz S') from the equipment under test 5 and compares it with a locally-generated reference version $S_R$.

In the alternative arrangement of FIG. 11, the same signal generator 21 generates the signals R, $R_R$; S, $S_R$, and the same test apparatus 1 processes both signals R' and S', either serially or in parallel. Note that signals R and $R_R$ are identical, but may be staggered in time to compensate for delay in the equipment under test, so that R' and $R_R$ are time-aligned, such that each element of one signal is compared with the corresponding element of the other.

FIG. 4 is a flowchart illustrating the various steps that take place in the test apparatus. This is an iterative process in which a test signal having a given vocal level is generated (step 30), processed through the customer equipment interface (step 31) and transmitted across the network (step 32). At the remote end a perceptual quality measurement is made (steps 33, 34, 35). A change in vocal level, to make the vocal level appropriate to the measured quality, is determined (step 36). This change in vocal level is compared with a threshold value (step 37), and if the change exceeds the threshold value then the process is repeated using the new vocal level (step 38). Otherwise, if the change in vocal level is below the predetermined threshold value then the signal quality value is selected as a final value. In the described embodiment, there is a post-processing step (step 39), which normalises the results for comparison with existing subjective techniques.

FIG. 5 shows schematically a typical customer interface between the customer and the local exchange, which is to be simulated by the customer equipment interface 2. As is also shown in FIG. 1, the interface with the rest of the network is by way of a subscriber line interface card 4, and the connection between the card 4 and the user of the system is made by way of a subscriber line 7, a telephone circuit 8, a mouthpiece 9a and an ear-piece 9b which interface with the user's mouth and ear. The customer equipment interface 2 also simulates the interaction between the user and the mouthpiece 9a, and between the user and the ear-piece 9b.

The customer equipment interfaces 2, 2a may be configured differently, to simulate a conversation between two users having equipments of different types (e.g. a fixed-to-mobile telephone call) or in different ambient situations (e.g. between users in environments with different ambient noise levels). In the arrangement of FIG. 11, the single customer equipment interface 2 may use different configurations for the two paths (3, 5, 6a; and 3a, 5, 6).

FIG. 6 illustrates the process by which two users reach an equilibrium in the characteristics of their voice level as they respond to the signal quality received on the return path. The first party 1 speaks at a level $V_{CS}$ which is detected by the second party 1a as having a signal quality $V'_{CS}$. The second party 1a responds to this perceived quality by speaking with a voice level $V_{CR}$ which is in turn received by the first party 1 with a perceived signal quality $Y'_{CR}$, causing him to adjust his voice level $V_{CS}$ in turn, thus causing the value of $V'_{CS}$ to change, and so on. Eventually an equilibrium is reached, when the perceived signal qualities $Y'_{CR}$, $V'_{CS}$ match the current voice levels $V_{CR}$, $V_{CS}$, which then need no further adjustment.

The user's perception of the quality of the telecommunications connection as a whole is related to the cognitive effort required to speak at the vocal level $V_{CS}$ perceived by the user to be appropriate. This perception, in turn, is related to the perceived quality $Y'_{CR}$ of the signal received from the other user. If a user detects a poor signal quality $Y'_{CR}$ he will intuitively adjust his vocal level $V_{CS}$. Adjustment of one user's vocal level $V_{CS}$ has a small direct feedback effect on the signal quality $Y'_{CR}$ perceived by that user, because of the presence of side tone, but quality perception is primarily determined by the quality of the signal received from the co-operating user on the return path.

Provided the path is reasonably symmetrical and time-invariant, the two users will each rapidly settle on an equilibrium level. If the path is very asymmetrical an equilibrium may not be reached so quickly, or at all, and one party, or more often both parties, are likely to perceive poor quality. For example, if attenuation is much greater in the forward path (1 to 1a) than the return path (1a to 1), the user 1 will receive a strong signal, and lower his voice level accordingly. The strong attenuation in the forward path will cause the signal received by the user 1a to be weak, and therefore of poor quality. This in turn will also cause him to suppose that the return path is equally poor (as would almost always be the case in a natural, face-to-face, conversation where both users are in the same ambient noise environment, or speaking to each other over the same long acoustic path), and he would raise his voice to compensate. This could in turn degrade the return path signal, through changes to the quality of the voice itself, and through the behaviour of the system, (e.g. peak clipping) resulting in an impairment in the perceived quality of the return path.

Both the need to speak with a raised voice, and the greater difficulty in listening to such a signal, affect mean opinion scores in subjective tests. FIG. 7 illustrates the subjective perceptual signal quality $Y'_C$ plotted against the received signal level V, which is modelled, for levels quieter than a value $V_{TH}$, in the apparatus to be described. The precise shape of the curve, and the values that $Y'_C$ take with respect to V vary according to a number of factors. The value $V_{TH}$ is a threshold value which will be explained later.

FIG. 8 illustrates schematically in more detail the conversion unit 24 of FIG. 3, in which the output $Y_{LE}$ from the psycho acoustic model 22 is mapped to a listener opinion index scale (mapping unit 27), then multiplied by a non-optimal loudness factor ("A") generated by the non-optimum loudness rating unit 25. The result is then mapped back to the listening effort measurement domain (mapping unit 28). This is then further mapped into a conversation signal quality measure in a further mapping unit 29.

FIG. 9 is a plot illustrating how a non-optimal loudness measure (the function generated in the non-optimum loudness rating unit 25) varies with deviation from optimum listening level.

FIG. 10 schematically illustrates the customer equipment interface 2. This interface has an input 40 from the test signal generator 21 carrying the signal S, to which is added the output from an ambient noise signal generator 41 filtered in a filter 42 according to the relative sensitivity to the noise and to speech of the microphone to be simulated. This combined output is passed through a filter 43 representing the mouth-to-junction sensitivity of the test signal. The resulting modified signal S is transmitted to the network 5 under test.

The customer equipment interface 2 also receives an input (signal R') from the network 5. This passes through a filter 45 which models the junction-to-ear sensitivity of the test signal, and then a second filter 46 which models the leakage effect (i.e. it removes that part of the sound signal which is reproduced by the loudspeaker in the ear-piece of the telephone equipment but does not get received by the user's ear. This is analogous to the noise input 42 in the 'send' path, which represents that part of the sound entering the microphone of the customer equipment which did not emanate from the customer's mouth. The output from the second filter 46 is transmitted as the degraded speech signal R' to the test apparatus 1. The ambient noise input 41 may also be added to the signal R'.

The customer equipment interface 2 also has a further output 48 which models the Side Tone of the respective customer equipment interface, which is used in calculation of the deviation from the optimum loudness ratio in the unit 25, as will be described.

The Customer Equipment Interface (CEI) 2 implemented between the test apparatus 1, 1a and the network represents the influence of the subscriber line 7, Customer Premises Equipment (CPE) and the interface with the human user. The purpose of the customer equipment interface 2 is to keep all aspects directly related to the user's environment, the termination equipment, its link to the local exchange, and, if appropriate, the two-wire/four wire junctions 4, 4a, easily accessible for changes, and not interfere with the underlying model incorporated in the test apparatus 1.

When performing an objective test, based on the perceived quality and clarity as experienced by the user, it is important to execute the test with conditions representative of the environment in which the system is to be used. The overall quality of a conversation link is determined not only by the long-distance and inter-exchange network but also to a large extent by connected telephones, their two-wire links from the local exchanges and the local noise environment. The Customer Equipment Interface (CEI) 2 incorporates these local-end factors, so enabling a direct connection to a network emulator at the four-wire point. The CEI in essence represents the customer's interface to the local exchange. It follows that it should incorporate any effects experienced on a real path between the junction and the mouth/ear reference points. These effects are well documented and are listed below:

Smj—Sensitivity from mrp (9a) to 600Ω junction 4 (modelled by Smj filter 43)

Sje—Sensitivity from 600Ω junction 4 to erp (9b) (modelled by Sje filter 45)

$L_E$—Leakage Effect between handset and pinna (external part of the ear)(modelled by leakage filter 46)

ΔASM—Sensitivity to noise over speech of handset microphone 9a (modelled by filter 42)

Noise—Background acoustic noise (modelled by noise generator 41)

STMR—SideTone Masking Rating (modelled by STMR output 48)

A typical telephone is provided with a feedback connection between the mouthpiece 9a and earpiece, 9b to feed part of the user's own speech signal back to his own ear. This feedback signal, known as "side tone", is provided in order to replace the acoustic feedback from mouth to ear, present in normal speech, which is partially lost when a user has an earpiece held close to one or both ears. The Side Tone Masking Rating is a measure of this coupling between the mouthpiece 9a and the earpiece 9b. It is defined in ITU-T Recommendation P.79, Annex B.

The 600Ω junction has been replaced in modern exchanges by the Subscriber Line Interface Card (SLIC) 4 which has a buffered four-wire connection. However telephone characteristics are still measured as referenced to the 600Ω junction.

It should be noted that all of these parameters are dependent on the telephone and its local connection. In this embodiment the IRS transfer characteristics are used, as published in ITU-T Recommendation P.48.

The basic operation of the test apparatus will be described firstly as a general overview, and then the individual processors will be discussed in greater detail.

As shown in FIG. 4, the test apparatus 1 is first connected to the network to be tested, configured according to the required test conditions. The test signal S, generated by the test signal generator 21, is transmitted by way of the customer equipment interface 2 into the network 5, and is received at the test apparatus 1a at the remote end. Conversely, test signal R is transmitted from apparatus 1a to apparatus 1. It will be appreciated that under test conditions the test apparatus 1, 1a may be arranged adjacent to each other, and may share physical components as shown in FIG. 11, although when a live network is under test the two test apparatuses 1, 1a may be geographically separated by a considerable distance.

In the next step (step 32) the test stimuli R, S are transmitted across the network, and also (signals $S_R$, $R_R$) input into the respective psycho acoustic model systems 22. It is important to the operation of the system that the same test stimuli R, $R_R$; S, $S_R$ are used by both test apparatus 1, 1a and that these are synchronised as will be described, so that the test apparatus can identify how the stimulus transmitted by the corresponding test apparatus has been impaired by the network under test.

Test apparatus 1 transmits signal S to test apparatus 1a, and also generates a reference signal $R_R$ for its own use, which it compares with the degraded version (signal R') received from the test apparatus 1a. Since the signal R' received over the network will be subject to transmission delays, the reference signal $R_R$ must be synchronised with the respective degraded signals R' received at the measuring point, resulting in it being generated with a delay with respect to the signal R transmitted from the remote end 1a. The converse also applies; test apparatus 1a generating a signal R for transmission, and a delayed reference signal $S_R$ for comparison with the signal S' received over the network 5 from test apparatus 1. The synchronisation of the reference signal $R_R$, $S_R$ with the received signals R', S' may be achieved by correlation techniques known in the art, for example as described in International Patent Specification WO96115597 (British Telecommunications plc).

In the next step, (step 33) the received test stimulus R', is analysed by a psycho-acoustic model, which may be of the type described in the prior art references referred to previously, to measure perceptual response to the measured distortions, weighted according to the response of the human auditory system, imposed by the network under test.

The output from the model is then compared (step 34) with the reference signal $R_R$, in a perceptual layer unit 23, which, as is known from the prior art references, generates a measure of the perceptual significance of the differences detected. This value, $Y_{LE}$ (listening effort), is a prediction of the listening effort score that a human subject would give, and is determined according to not only the audibility but also the perceptual importance of such differences, since it has been found that some distortions to speech signals are easier for the human perceptual system to compensate for than others.

In the next step (step 35) the value $Y_{LE}$ is modified by a factor according to the Loudness Rating of the incoming signal, generated by an output from an Overall Loudness Rating (OLR) unit 25. OLR is a weighted average of the frequency-dependent loss between the mouth reference point (mrp) 9a of the user, and the ear reference point (erp) 9b of the listener. The method of assigning the Loudness Rating as a single figure is based on subjective principles, and is defined as the gain that must be introduced into the path to make it equal in loudness to the Intermediate Reference System (IRS) as described in ITU-T Recommendation P.48 [1988: "Specification for an Intermediate Reference System]. The formula for OLR is:

$$OLR = -\frac{10}{m}\log_{10}\sum_{n=1}^{N}10^{\wedge}\left(\{A(n)-P_M(n)-L_E(n)-W_0(n)\}\Big/\frac{10}{m}\right)$$

where $A(n)$=Acoustic level at ear reference point in dBPa $P_M(n)$=Acoustic level at mouth reference point in dBPa $L_E(n)$=Leakage effect in dB $W_O(n)$=Weighting factor: the values may be those used in ITU-T Recommendation P.79.

N=14 for a narrowband signal.

Values of "m" have been derived empirically; a value m=0.175 being international accepted under ITU-T Recommendation P.79 (March 1993: "Calculation of Loudness Levels for Telephone Handsets"). A value m=0.225 has been found by the applicant to be a better approximation to real human responses when using English-language-only data. (Supplement No 3 in CCITT 'Blue Book' Vol 5 "Telephone Transmission Quality Series P recommendations"). Other values may be determined for other data sets.

It should be noted that OLR calculations are normally performed using sine waves placed at the ⅓ octave centre frequencies. However, when assessing complex non-linear systems there is a need to use a speech-like test stimulus as described above to pass through devices such as low-bit rate codecs. Since Loudness Ratings are a measure of frequency-dependent loss it is possible to use wide-band signals to obtain equivalent results, though it should be noted that the use of the artificial test stimulus to determine OLR will be more susceptible to error from circuit noise contributions at higher frequencies.

When calculating CCITT Loudness Ratings using only the fourteen bands having centre frequencies from 200 Hz to 4000 Hz, a correction of 0.3 dB must be subtracted, either from each weighting factor, or from the final result. This correction makes the results approximately equal to those that would have been obtained if all twenty bands (100 Hz to 8000 Hz) had been used in the calculation.

This overall loudness rating is used to calculate a non-optimal loudness measure referred to in this specification as the A-factor.

When conversing over a telephone network there is an optimum level for the human ear to listen at. The more the level deviates from this optimum the more difficult understanding becomes. The A-factor models this effect. The A-factor is a scalar quantity that affects the $Y_{LE}$ value depending on the overall loudness of the connection and the deviation of the vocal level from that optimum value. As shown in FIG. 9, if the overall loudness of the connection is close to the currently accepted optimum (8 dB) the A-factor equals unity. As the loudness diverges away from the optimum the factor becomes smaller.

This effect is mapped using the following formulae and conditions:

define $P=OLR+V_C-V_L-8$

If P is greater than or equal to zero:

$A=1.01005-\{257.1\times10^{-6}(P-1.56)^2\}$

If P is less than zero:

$A=1.00125-\{555.6\times10^{-6}(P-1.5)^2\}$ with 'A' kept in the range 1.0 to 0.001, and clipped at values exceeding this range, and where:

$V_C$=Opposite party's present vocal level $V_L$=Opposite party's initial vocal level.

The listening effort value $Y_{LE}$ has been derived from existing perceptual measurement techniques, whilst the overall loudness rating OLR has been defined according to existing two-way linear (i.e. non-perceptual) standards. These definitions are not directly comparable. They are combined in the conversion unit 24, illustrated in FIG. 8. The A-factor as defined above is a multiplier of a listener opinion index (LOI) rather than the listening effort value $Y_{LE}$ generated by the perceptual model 23. The listener opinion index is a transform scale from the listening effort output from the perceptual layer 23. In order to combine these values ($Y_{LE}$ and A), the listening effort measure $Y_{LE}$ output from the perceptual model 23 is transformed to the listener opinion index LOI in mapping unit 27, then multiplied by the non-optimal loudness factor (A-factor), and then transformed back to the listening effort scale $Y_{LE}$ (mapping unit 28)

The mapping between the Listener Opinion Index scale and Listening Effort scale used in the mapping units 27, 28 applies the correction factor due to non-optimal listening level. The transfer is a simple Logit function process:

$$\ln\left(\frac{Y_{LE}}{4-Y_{LE}}\right) = 1.465\ln\left(\frac{LOI}{LOI_{LIM}-LOI}\right) - 0.75$$

where $LOI_{LIM}$=4 for wide band and 0.885 for narrow band

After multiplying by the A-factor, the inverse function is then performed on the modified Listener Opinion Index.

The final part of step 35 is to generate a conversational mean opinion score $Y_C$ prediction, which takes place in calculation unit 26 (FIG. 3). This uses an algorithm which is split into two parts, the first being an intermediate $Y'_C$ for the vocal level equilibrium process followed by a final adjustment once the stable vocal level condition is determined. The formula for the intermediate value $Y'_C$ is:

$$\ln\left(\frac{Y'_C}{4-Y'_C}\right) = 0.7\left[\ln\left(\frac{Y_{LE}}{4-Y_{LE}}\right) + 0.5 - \left(\frac{K\times13-STMR)}{20}\right)\left(\frac{4-Y_{LE}}{Y_{LE}}\right)^2\right]$$

where

K=1 if STMR<13

K=0 otherwise

The value of STMR (Sidetone Masking Rating) is input to the calculation unit 26 from the customer equipment interface 2 (see FIG. 3).

In the following step (step 36) a change to the conversation vocal level $V_{CS}$ to be generated by the test apparatus 1 is calculated based on the output $Y'_{CR}$ of the conversational signal quality received by the same test apparatus.

$V_{CS}=V_{LS}+4.0-2.1Y'_{CR}-[0.3K(13-STMR)]$ $V_{CR}=V_{LR}+4.0-2.1Y'_{CS}-[0.3K(13-STMR)]$ where $V_{LS}$, $V_{LR}$ are the values of the respective vocal levels on the first iteration.

The change in the value of $V_C$ from the previous iteration of $V_C$ is next determined (step 36). If the value of $V_C$ changes by an amount which exceeds a predetermined threshold, (step 37) then the signal level to be used by the signal generator 21 is adjusted to the new value of $V_C$ (step 38), and the process is repeated. Note that both test units 1, 1a operate in this way. As shown in FIG. 6 the value of $Y'_{CR}$ detected at one test apparatus 1 is used to control the value of $V_{CS}$ of the signal generator at the same test apparatus, to generate a signal which is transmitted to the other apparatus 1a to generate a value of $Y'_{CS}$ there, and thereby generate a corresponding value of $V_{CR}$ for the transmission back to the first test apparatus.

The initial vocal level $V_L$ for the first iteration is determined using the following formula:

$$V_L = 10 \log_{10}(Q)$$

where:

$$Q = \sum_{i}^{n} 10^{\frac{(BDDELF[i]+Smj[i])}{10}}$$

i=the $i^{th}$ of n ⅓ octave bands, and BDDELF=Speech power per frequency band at mrp reference vocal level in dBPa. This is an attribute of the test signal.

The value $V_L$ is only dependent on the Customer Equipment Interface (CEI) and the test signal, since BDDELF is based on the reference vocal level. A single IRS customer equipment interface with zero Sending Loudness Rating (SLR) was used during initial study, giving $V_L$ a value of −13.63 dBV. Similarly the STMR has a constant value over all iterations (12.43 dB) when using the IRS customer equipment interface, so the value of $V_C$ can only vary between the limits −9.80 dBV to −18.20 dBV.

This process continues (steps 32–38 inclusive) until the change in the value of $V_C$ falls below the predetermined threshold value, (i.e. value $V_C$ stabilises).

The algorithm mimics the physical limitations of vocal level by bounding the level adjustments so as to result in a level within the practical range.

A final transformation of $Y'_C$ may be made (step 39) according to the following formula:

$$\ln\left(\frac{Y_C}{4-Y_C}\right) = 0.8451 \ln\left(\frac{Y'_C}{4-Y'_C}\right) - 0.2727$$

in order to normalise the values with existing mean opinion score measures, so that comparisons can be made.

The above algorithm models the behaviour of a real system (user/equipment interface) as plotted in FIG. 7, provided the received level is quieter than (i.e. in FIG. 7 to the right of) the threshold value $V_{TH}$. If the received level is louder than this, the output at the ear-reference point (erp), although clearly audible, is too loud, causing the subject discomfort and resulting in a lower mean opinion score. This situation would occur if network mouth-to-ear sensitivity is too high, as is currently experienced in some networks. This could be captured as a warning message to the user if the deviation from optimum listening level is negative and the A-factor is less than 1. Alternatively, a more complex algorithm may be used which models the behaviour of real systems for values of V louder than $V_{TH}$.

It will be noted that because of delays in the system under test the incidence of double talk, single talk and mutual silence (FIG. 2) will not be the same in the two test locations 1, 1a. One or both test signals may be modified by initiating selected speech segments at times determined in relation to cues in the speech segments of the other signal and the measured delay in the system, for example such that a segment is transmitted at the correct time to cause double-talk at the remote end. A suitable method for acheiving this is disclosed in the applicant's co-pending International Patent application having the same filing date as the present application and claiming priority from the same applications. In this specification a method is described in which the system is tested to simulate a realistic conversation. The first measurement device 1 makes a call, through the system 5 it is testing, to a second measurement device 1a, and the devices 1, 1a converse using speech generated dynamically by each device according to predetermined responses to the signal received from the other, to simulate aspects of conversation over non-perfect communications system link. The progress of the conversation will therefore take different courses according to the quality of the link 5. For example, if an expected speech segment is detected by one device 1a, it transmits an appropriate predetermined response to the other device 1. However, if the expected speech segment is corrupted, or not received at all, different predetermined responses (or no response at all) are transmitted to the device 1. This in turn may cause the device 1 to repeat the appropriate speech segment.

Because all the responses, including those to poor quality signals, are predetermined, each device 1, 1a can readily determine the quality of the speech segments received, because each speech segment received by one device from the other must be one of a limited number of possible responses to the last transmission made by the one device to the other.

The devices 1, 1a perform measurements on the sounds they receive from each other, and monitor the progress of the conversation to compute parameters describing aspects of the received signal quality.

What is claimed is:

1. A method for testing telecommunications equipment over which two-way speech traffic can be carried between a first test point and a second test point, the method comprising;
   a) generating first and second test signals representative of normal conversation, and each having a predetermined vocal level,
   b) transmitting the first test signal from the first test point to the second test point,
   c) simultaneously transmitting the second test signal from the second test point to the first test point,
   d) measuring the quality of the test signals received at the respective test points,
   e) determining a vocal level adjustment to be made in response to the quality measured at each test point, and
   f) adjusting the vocal levels of the first and second test signals,
      the said steps being repeated until a predetermined condition is reached, and an output being generated when said predetermined condition is reached, the output being indicative of the quality measured; wherein the quality measurement uses a perceptual analysis process which measures the extent to which the received signals carry distortions which would be perceptible to a human listener.

2. A method according to claim 1 wherein between the first test point and telecommunications equipment, and between the telecommunications equipment and the second test point, there are interposed customer equipment interface simulators which simulate the modifications to the signals which occur between the respective talkers and the telecommunications equipment under test, and between the telecommunications equipment under test and the respective listeners.

3. A method according to claim 2 in which each customer equipment interface simulator models the effects of sound leakage in the telephone user/equipment interface.

4. A method according to claim 3, wherein each customer equipment interface simulator generates a noise signal for combining with the respective test signal, the noise signal being modified in accordance with the frequency response of a microphone, to simulate the sensitivity of the microphone to ambient noise.

5. A method according to claim 2, in which the quality of the received test signals are determined at the testing points in accordance with the measured listening effort of the received signal, and the Sidetone Masking Rating of the customer equipment interface.

6. A method according to clam 5, in which the quality of each received test signal $Y'_C$ is derived according to the formula:

$$\ln\left(\frac{Y'_C}{4-Y'_C}\right) = 0.7\left[\ln\left(\frac{Y_{LE}}{4-Y_{LE}}\right) + 0.5 - \left(\frac{K \times 13 - STMR}{20}\right)\left(\frac{4-Y_{LE}}{Y_{LE}}\right)^2\right]$$

where
K=1 if STMR<13
K=0 otherwise,
$Y_{LE}$ is the measured listening effort of the received signal, and
STMR is the Sidetone Masking Rating value generated by the customer equipment interface simulator.

7. A method according to claim 2 in which the vocal level adjustment to be made at each test point is determined in accordance with the measured signal quality at the respective test point, and the properties of the customer equipment interface.

8. A method according to claim 7, in which the vocal level adjustment is given by $V_C-V_L$ determined as;

$$4.0-2.1Y'_C-[0.3K(13-STMR)]$$

where: $Y'_C$ is the received signal quality at the test site:
STMR is the Sidetone Masking Rating at the respective customer equipment interface:
K=1 if STMR<13
K=0 otherwise.

9. A method as claimed in claim 1 in which the, or one of the, predetermined conditions for the generation of an output indicative of quality is a condition that the vocal level adjustment to be made to one or both test signals in response to the measured quality at the respective test point does not exceed a predetermined value.

10. A method according to claim 1 in which one of the predetermined conditions at which an output indicative of quality is generated is that the received vocal level exceeds a predetermined value, such that an output is generated to indicate an impaired signal quality.

11. A method according to claim 1 in which a first measurement device at the first test point makes a call, through the system to be tested, to a second measurement device at the second test point, and the devices converse using speech segments dynamically generated by each device according to predetermined responses to the respective speech segments received by said devices, to simulate aspects of conversation over a non-perfect communications system link.

12. Apparatus for testing telecommunications equipment over which two-way speech traffic can be carried between a first test point and a second test point, the apparatus comprising:
means for generating first and second test signals representative of normal conversation, each having a predetermined vocal level;
means for supplying the first test signal to the first test point for transmission to the second test point;
means for detecting at the first test point a signal received from the second test point;
means for measuring the quality of the detected signal by comparison with the second test signal, using a perceptual analysis process in which the extent is measured to which the received signals carry distortions which would be perceptible to a human listener;
means for determining a vocal level adjustment to be made in response to the measured quality;
means for adjusting the vocal level of the first test signal until a predetermined condition is reached; and
means for generating an output indicative of the quality measured when said predetermined condition is reached;
wherein between the test apparatus and telecommunications equipment is interposed a customer equipment interface simulator which simulates the modifications to a signal which occur between a talker and the telecommunications equipment under test, and between the telecommunications equipment under test and the listener; and in which the customer equipment interface simulator includes means for modelling the effects of sound leakage in a telephone user/equipment interface.

13. Apparatus for testing telecommunications equipment over which two-way speech traffic can be carried between a first test point and a second test point, the apparatus comprising:
means for generating first and second test signals representative of normal conversation, each having a predetermined vocal level;
means for supplying the first test signal to the first test point for transmission to the second test point;
means for detecting at the first test point a signal received from the second test point;
means for measuring the quality of the detected signal by comparison with the second test signal, using a perceptual analysis process in which the extent is measured to which the received signals carry distortions which would be perceptible to a human listener;
means for determining a vocal level adjustment to be made in response to the measured quality;
means for adjusting the vocal level of the first test signal until a predetermined condition is reached; and
means for generating an output indicative of the quality measured when said predetermined condition is reached;
wherein between the test apparatus and telecommunications equipment is interposed a customer equipment interface simulator which simulates the modifications to a signal which occur between a talker and the telecommunications equipment under test, and between the telecommunications equipment under test and the listener; and the customer equipment interface simulator has means for generating a noise signal for combining with the respective test signal, the noise signal being modified in accordance with the frequency response of a microphone, to simulate the sensitivity of the microphone to ambient noise.

14. Apparatus according to claim 12, in which the quality of the detected signal is determined in accordance with the measured listening effort of the received signal and the Sidetone Masking Rating of the customer equipment interface.

15. Apparatus according to claim 14 in which the vocal level adjustment is given by:

$$V_{CS}=V_{LS}+4.0-2.1Y'_{CR}-[0.3K(13-STMR)]$$

and $$V_{CR}=V_{LR}+4.0-2.1Y'_{CS}-[0.3K(13-STMR)]$$

where: $Y'_{CR}$, $Y'_{CS}$ are the received signal qualities at the test sites, and STMR is the Sidetone Masking Rating at the respective customer equipment interface:

K=1 if STMR<13

K=0 otherwise.

16. The combination of two apparatuses, each apparatus for testing telecommunications equipment over which two-way speech traffic can be carried between a first test point and a second test point, each apparatus comprising:

means for generating first and second test signals representative of normal conversation, each having a predetermined vocal level;

means for supplying the first test signal to the first test point for transmission to the second test point;

means for detecting at the first test point a signal received from the second test point;

means for measuring the quality of the detected signal by comparison with the second test signal, using a perceptual analysis process in which the extent is measured to which the received signals carry distortions which would be perceptible to a human listener;

means for determining a vocal level adjustment to be made in response to the measured quality;

means for adjusting the vocal level of the first test signal until a predetermined condition is reached;

means for generating an output indicative of the quality measured when said predetermined condition is reached; and the combination being for connection to respective first and second test points of a telecommunications equipment, and both arranged to generate the same first and second test signals, and to supply respectively the first and second signals to their respective test points, for transmission to the respective other test point, and to compare the signal received at the respective test point with the second and first test signals respectively.

17. Apparatus for testing telecommunications equipment over which two-way speech traffic can be carried between a first test point and a second test point, the apparatus comprising:

means for generating first and second test signals representative of normal conversation, each having a predetermined vocal level;

means for supplying the first test signal to the first test point for transmission to the second test point;

means for detecting at the first test point a signal received from the second test point;

means for measuring the quality of the detected signal by comparison with the second test signal, using a perceptual analysis process in which the extent is measured to which the received signals carry distortions which would be perceptible to a human listener;

means for determining a vocal level adjustment to be made in response to the measured quality;

means for adjusting the vocal level of the first test signal until a predetermined condition is reached;

means for generating an output indicative of the quality measured when said predetermined condition is reached; and means for simulating a conversation comprising:

a store for storing a plurality of speech segments forming a conversation;

a receiver for receiving speech segments from one or more complementary devices, a comparison device for comparing speech segments received by the receiver with speech segments stored in the store;

selection means responsive to the comparison device for selecting from the store a speech segment for transmission to the complementary device or devices, in accordance with the content and quality of the received speech segments; and transmission means for transmitting a speech segment selected by the selection means to the complementary device or devices.

18. A test stimulus suitable for use in the method of claim 1 comprising two signals for simultaneous transmission from respective test points, wherein the test stimulus comprises different segments in which:

a) only the first test point or b) only the second test point or c) both test points or d) neither Lest point;

generates a signal having a spectral resemblance to human speech but not conveying intelligent content, and in which a noise signal is superimposed on one or both speech like signals.

19. A test stimulus according to claim 18, wherein the stimulus is modified in order to model the frequency response of a microphone to be simulated.

* * * * *